(12) United States Patent
Sanders et al.

(10) Patent No.: US 6,778,687 B2
(45) Date of Patent: Aug. 17, 2004

(54) FINGERPRINT MATCHING SYSTEM WITH ARG-BASED PRESCREENER

(75) Inventors: Albert R. Sanders, Orlando, FL (US); James F. Curtis, Orlando, FL (US); Holger Findling, Orlando, FL (US)

(73) Assignee: Lockheed Martin Corporation, Bethesda, MD (US)

( * ) Notice: Subject to any disclaimer, the term of this patent is extended or adjusted under 35 U.S.C. 154(b) by 647 days.

(21) Appl. No.: 09/841,144

(22) Filed: Apr. 24, 2001

(65) Prior Publication Data

US 2002/0168093 A1 Nov. 14, 2002

(51) Int. Cl.$^7$ .................................................. G06K 9/00
(52) U.S. Cl. ........................................ 382/125; 382/124
(58) Field of Search ............................ 382/125, 124, 382/126, 127; 340/5.53, 5.83; 356/71

(56) References Cited

U.S. PATENT DOCUMENTS

| 4,135,147 A | * | 1/1979 | Riganati et al. ............ 382/125 |
| 5,613,014 A | * | 3/1997 | Eshera et al. ............... 382/124 |
| 5,799,098 A | * | 8/1998 | Ort et al. .................... 382/125 |
| 5,878,158 A | * | 3/1999 | Ferris et al. ................ 382/125 |

FOREIGN PATENT DOCUMENTS

EP          0 050 842    *    5/1982             G06K/9/68

* cited by examiner

Primary Examiner—Bhavesh M. Mehta
Assistant Examiner—John Strege
(74) Attorney, Agent, or Firm—Eric R. Katz

(57) ABSTRACT

A prescreen filtering method and algorithm based upon Attributed Relational Graph (ARG) techniques are employed in a node-by-node matching to individually determine a best alignment of the sets of minutia of a pair of search and file fingerprints. First, the directional components of each and every different pair of minutia from the two sets are compared to ensure that they are within a given angular tolerance, which is selected to allow for a reasonable variation in possible rotational misalignments. After this directional alignment tolerance criteria has been passed, a Distance Matrix (DM) score is generated for each passed [u,v] minutia pair by performing a virtual alignment of the [u,v] minutia pair in location and direction, and then by comparing the distances and relative orientations between each of four pairs of minutia neighbors in each of the four local quadrants, which represents how well each different [u,v] minutia pair match each other. The size of a set of well matched minutia pairs, relative to the sizes of other sets of well matched minutia pairs for all other file fingerprints in the repository file, determines if a particular file fingerprint is passed along to the more complete and rigorous matching functions of an Automated Fingerprint Identification System (AFIS).

9 Claims, 3 Drawing Sheets

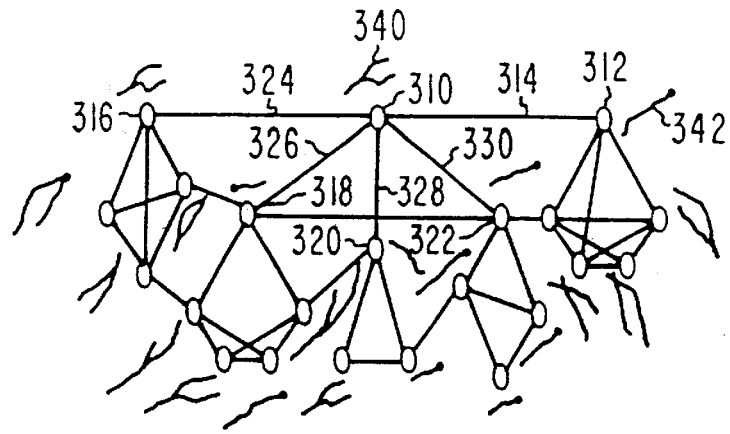
Fig. 2
| x,y LOCATION | DIRECTION | LOCAL RIDGE WIDTH | MINUTIA TYPE |
|---|---|---|---|
| 18 bits | 8 bits | 8 bits | 1 to 2 bits |
Fig. 3
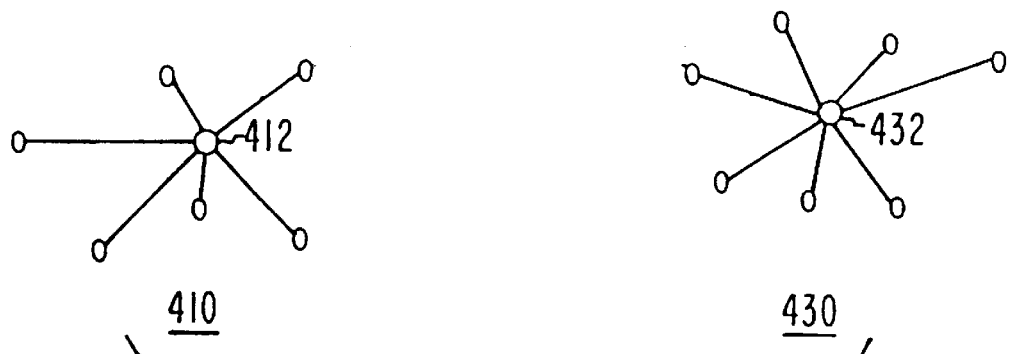
Fig. 4

FINGERPRINT MATCHING SYSTEM WITH ARG-BASED PRESCREENER

FIELD OF THE INVENTION

This invention relates to fingerprint matching systems, and possibly to systems for the matching of personal characteristics other than fingerprints, and more particularly, to matching systems, e.g. FBI/AFIS (Federal Bureau of Investigation/Automated Fingerprint Identification System) systems in which a fingerprint or other personal characteristic is to be matched to reference or file fingerprints or characteristics in a database by a prescreen ARGMatch™ (Attributed Rotational Graph) identification algorithm of the FBI/AFIS program.

BACKGROUND OF THE INVENTION

Pattern matching or comparison schemes have many applications, such as identifying machine parts in a manufacturing context, and the reading of addresses in a mail sorting context. The above-mentioned applications are among the simpler uses of such comparison schemes, because in the case of machine parts, the number of different parts is finite, and their shapes are in general fairly simple; the text reading context has only twenty-six letters and ten numbers to identify, although the number of permutations of text is large.

More complex types of comparisons are those involving differentiation among items which are similar, but not identical. This is especially so when the conditions under which the images are formed are not uniform. When the images are of biological specimens, the variability of the images may be substantial. One such aspect of image matching is that of matching the retinal patterns of subjects for identification. Another use is that of matching fingerprints for comparison with file fingerprints.

Fingerprints are very rich in information content. There are two major types of information in a fingerprint. First is the ridge flow information, and second are the specific features or "minutia" of the fingerprint. As used herein, the term "minutia" is used to denote both the singular and plural. Fingerprints uniquely identify an individual based upon their information content. Information is represented in a fingerprint by the minutia and their relative topological relationships. The number of minutia in a fingerprint varies from one finger to another, but, on average, there are about eighty (80) to one hundred and fifty (150) minutia per fingerprint. In the fingerprint context, a large store of file fingerprints exists in law enforcement offices around the country. These file fingerprints include fingerprints of known individuals, made in conjunction with their apprehension or for some other reason such as a security clearance investigation or of obtaining immigration papers, often by rolling the inked fingers on cards, and also includes copies of latent fingerprints extracted from crime scenes by various methods.

These file or reference fingerprints are subject to imperfections such as overinking, which tends to fill in valleys in fingerprints, and underinking, which tends to create false ridge endings, and possibly overinking and underinking in different regions of the same fingerprint image. Smudges and smears can also occur at different places in the fingerprint due to unwanted movement of the finger, or uneven pressure placed on the finger during the rolling process. The stored file fingerprints are also subject to deterioration while in storage, which may occur, for instance, due to fading of the older images or due to stains. Moreover, the wide variation in the level of experience among fingerprint operators, and the conditions under which the fingerprints are obtained, produce a wide variation in quality of the fingerprint images. Similar effects occur due to variation of the scanning devices in cases of live scanning of fingerprints.

Matching of fingerprints in most existing systems relies for the most part upon comparison of cores and deltas as global registrations points. This tends to render such comparisons susceptible to errors due to the many sources of distortion and variations mentioned above, which almost always occur due to the various different inking, storage and preprocessing conditions which may be encountered.

As described at pages 164–191 of the text ADVANCES IN FINGERPRINT TECHNOLOGY, by Henry C. Lee and R. E. Guenssten, published by L. Elsevier in 1991, efforts have been underway for a long time to automate fingerprint identification. This is because manual searching is no longer feasible due to the large number of reference files. The effort to automate fingerprint identification involves two distinct areas. The first is that of fingerprint scanning and minutia identification, and the second is a comparison of lists of minutia relating to different fingerprints in order to identify those which match. Large files of reference or file fingerprints have been scanned, and minutia lists in digital form obtained therefrom, either by wholly automated equipment, or by semiautomated equipment requiring human assistance. While not all problems in scanning of fingerprints and detection of minutia have been solved, it appears that the matching problem is the more pressing at this point in the evolution of the technology.

The matching or search subsystem constitutes the most critical component of any Automated Fingerprint Identification System (AFIS). Its performance establishes the overall system matching reliability (the probability of declaring a correct match, if one exists in the database), match selectivity (the average number of false candidates declared in each search attempt), and throughput, which is particularly important in large database systems. The unique identification of fingerprints is usually performed using the set of minutia contained in each fingerprint. For each fingerprint, these minutia form a minutia map.

For example, U.S. Pat. No. 5,613,014, issued Mar. 18, 1997 in the name of Eshera et al, describes a fingerprint matching technique using a graphical Attribute Relational Graph (ARG) approach. This ARG approach is fast, and particularly advantageous for those cases in which the minutia of the unknown or search fingerprint are numerous and well defined, but may be hindered in finding the correct match by errors in locating minutia near the center of each star in the fingerprint when the latent image is poor and minutia are missing.

U.S. Pat. No. 5,933,516, issued Aug. 3, 1999 to Tu et al, discloses a fingerprint matching method by an estimation of a maximum clique. During operation, a base pair of minutia is selected in the unknown or search fingerprint under consideration and each reference or file fingerprint. For each base pair selected for comparison, those sets of minutia pairs are selected which satisfy a priori constraints including angle, distance and ridge counts, to generate a first set of minutia which support the fingerprints correspondence. A second set of supporting minutia pairs is generated from the first set which doesn't contain pairs which are inconsistent with the base pair bias angle. A third set is established using "dynamic programming" to determine the largest topologically self-consistent subset of the second set. The minutia pairings are counted in the third set to establish the merit of the base pair.

For each of the minutia of the unknown or search fingerprint, a correspondence group is generated of a predetermined number of minutia of the reference or file fingerprint which have the greatest merit. The correspondence group is searched for a maximal clique in which every search reference fingerprint minutia pair is consistent with every other minutia pair in the clique. A cardinality equal to the number of search reference fingerprint minutia pairs in the maximal clique is stored. The steps are then repeated to generate a set of cardinalities.

In those cases in which the search print quality or other considerations result in failure to perfectly match by the ARG method, it may be desirable to perform a match using a larger number of constraints than in the ARG technique.

Comparing a fingerprint image obtained in any fashion, from inked rollings to live scan, with a large repository of similarly obtained fingerprint images is a task best accomplished through a cascaded series of processing proceeding from course to fine grain matchings. Speed of execution is a necessary component of the process. To that end, a prescreen filtering algorithm based upon an ARG matching algorithm, e.g., the ARGMatch™ identification algorithm of the FBI/AFIS program, would be a significant contribution to the state of the art of automated fingerprint identification.

SUMMARY OF THE INVENTION

To that end, the present invention provides a prescreen filtering method and algorithm based upon an ARG matching method and algorithm, e.g. the ARGMatch™ identification method and algorithm of the FBI/AFIS program, and provides several significant differences from conventional approaches. Attributed Relational Graph (ARG) techniques are employed in a node-by-node matching to individually determine a best alignment of the minutia of the search and file fingerprints. The approach is preferably a software implementation (versus a hardware implementation), lending itself to ease of implementation in any number of architectures, as well as ease of upgrades when speed and reliability improvements are realized.

For each minutia (termed a central minutia in the explanation below) of a fingerprint that is characterized in both a search fingerprint and a reference file fingerprint in a reference file, a set of minutia neighbors is determined for that central minutia based upon its directional component. The space about each central minutia is divided into four quadrants, with the first quadrant being centered about the directional component of the central minutia, and the second, third and fourth quadrants being spaced every 90° in a counterclockwise direction from the first quadrant. The closest minutia in each of the four quadrants is determined to be the minutia neighbor in that quadrant for each central minutia. In alternative embodiments, other types of coordinate systems and quadrants can be employed, such as a clockwise spacing of quadrants, a different number of quadrants, or a polar coordinate system.

Let U be a set of minutia for a search fingerprint and V be a set of minutia for a reference or file fingerprint. The Distance Matrix (DM) ARGMatch™ identification method and algorithm of the FBI/AFIS system, modified for quadrant neighbor processing, generates a Distance Matrix (DM) score for each and every different pair of minutia [u,v] in the two different sets of minutia U, V.

First, the directional components of each and every different pair of minutia from the two sets are compared to ensure that they are within a given angular tolerance, which is selected to allow for a reasonable variation in rotational alignments which are a result of the different fingerprint collection and imaging processes, but does not allow a pair of minutia from completely different ridge flows to be compared.

After this directional alignment tolerance criteria has been passed, a Distance Matrix (DM) score is generated for each passed [u,v] minutia pair by performing a virtual alignment of the [u,v] minutia pair in location and direction, and then by comparing the distances and relative orientations between each of the four pairs of minutia neighbors in each of the four quadrants, which represents how well each different [u,v] minutia pair match each other.

For a minutia pair [u,v], if the maximum DM score for $[u,v_j]$ (i.e., a single search minutia u compared with all of the file minutia) occurs at v, and similarly the maximum DM score for $[u_i, v]$ (i.e., a single file minutia v compared with all of the search minutia) occurs at u, then this minutia pair [u,v] is considered to be well matched. In order to prevent the pairing of poorly aligned minutia, a minimum DM score must be obtained in order for the minutia pair to be considered well matched.

A set of well matched minutia pairs forms the basis for the prescreen function of the present invention. The size of this set of well matched minutia pairs, relative to the sizes of other sets of well matched minutia pairs for all other file fingerprints in the repository file, determines if a particular file fingerprint is passed along to the more complete and rigorous matching functions of an Automated Fingerprint Identification System (AFIS), in a manner as disclosed in U.S. Pat. Nos. 5,613,014 and 5,933,516.

A final consistency check is performed on this set of well matched minutia pairs. The difference of each minutia pair's directional components (a virtual rotational transformation) is computed and placed into a histogram. Following a smoothing process, the maximum value in the histogram indicates the most likely rotational transformation for a matching of this set of well matched minutia pairs. Using the most likely rotational transformation, the difference of each minutia pair's directional components of the set of well-matched minutia pairs is now recomputed, and any minutia pair exhibiting a directional difference greater than a given tolerance is removed from further consideration, to derive a final set of well-matched minutia pairs.

The size of this final set of well matched minutia pairs is the prescreen function or metric for a particular search-file pair of fingerprints. In general, the prescreen function passes along a top percentage of the number of file fingerprints forming the repository file for further AFIS processing. The size of this final set of well matched minutia pairs is the metric or criteria that is used in determining the top percentage.

BRIEF DESCRIPTION OF THE DRAWINGS

The foregoing objects and advantages of the present invention for a fingerprint matching system with ARG-based prescreener may be more readily understood by one skilled in the art with reference being had to the following detailed description of several preferred embodiments thereof, taken in conjunction with the accompanying drawings wherein like elements are designated by identical reference numerals throughout the several views, and in which:

FIG. 2 is an Attributed Relational Graph (ARG) representation of the minutia of a fingerprint.

FIG. 3 is a representation of a possible bit structure of a node attribute vector.

FIG. 4 illustrates a pair of stars from attributed relational graphs of two fingerprints being compared, with each star being made up of a central node, branches from the central node, and neighbor nodes.

DETAILED DESCRIPTION OF THE INVENTION

Figure 1:
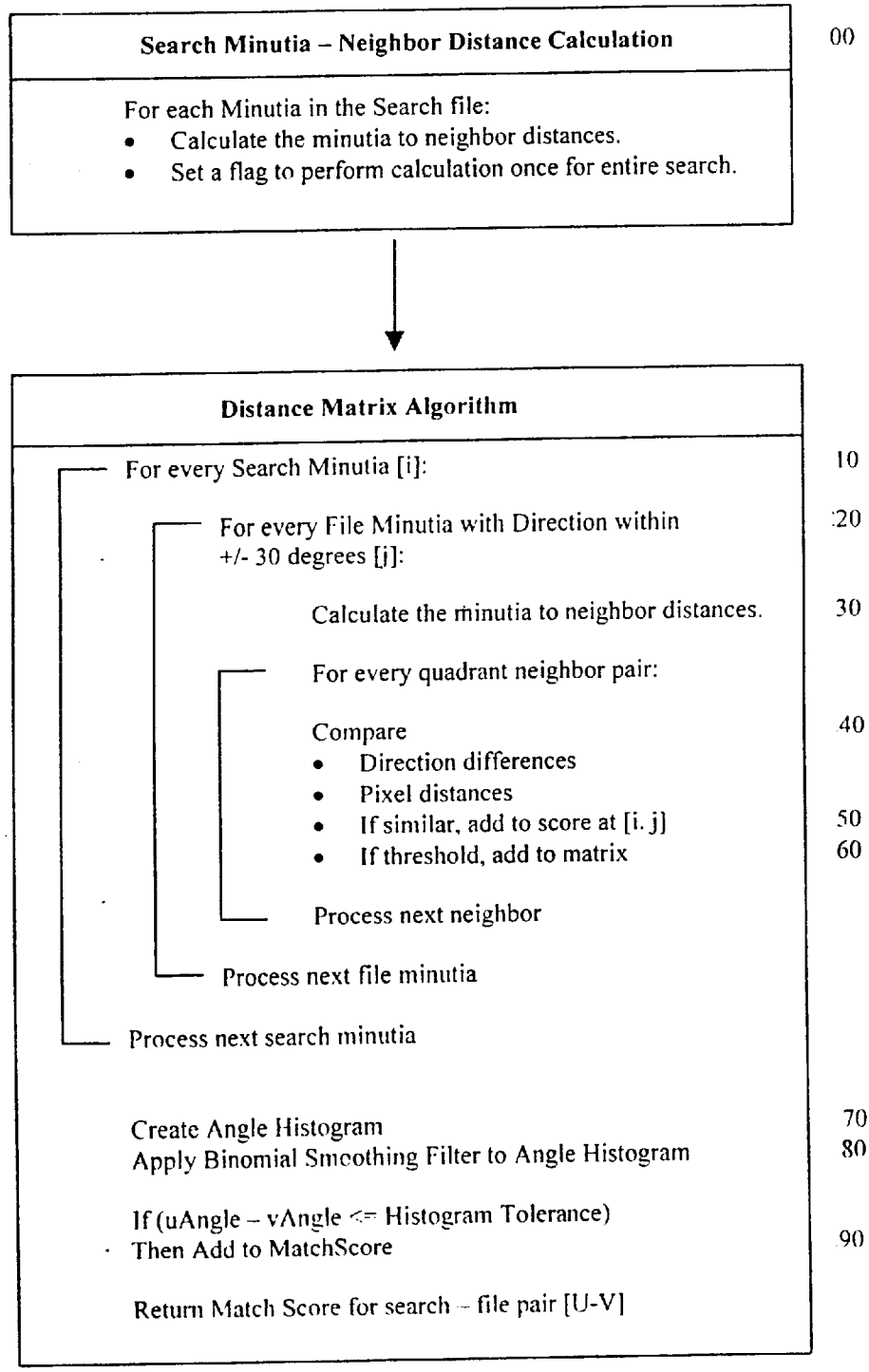
FIG. 1 is a diagram of an Attribute Relational Graph (ARG)-based prescreen method or algorithm of the present invention which prescreens reference or file fingerprints against a search fingerprint, and or selects a top percentage of the most promising reference or file fingerprints for further processing in an Automated Fingerprint Identification System (AFIS).

A file print is a characterization of a fingerprint image that has been obtained either by an inked rolling of a fingerprint, a live scan of a fingerprint, or some similar method, which has been placed in a repository file. A search print is a characterization of a fingerprint image that has been obtained through a similar means as a file print, and is to be compared with all of the file prints in the repository file. Minutia are ridge events that have been extracted from a fingerprint image during the characterization process. The information that is saved with respect to each minutia includes the location and the directional orientation (ridge flow) of the minutia.

The present invention is related to the fingerprint matching systems disclosed in U.S. Pat. Nos. 5,613,014 and 5,933,516, the disclosures and specifications of which are specifically incorporated by reference herein, and concerns a prescreen routine or filtering algorithm which is based upon the ARG (Attributed Relation Graph) Match™ identification algorithm as disclosed in U.S. Pat. Nos. 5,613,014 and 5,933,516.

U.S. Pat. Nos. 5,613,014 and 5,933,516 disclose, discuss and define many of the concepts and terms used herein, in particular an Automated Fingerprint Identification System (AFIS), fingerprint minutia, Attributed Relational Graphs (ARG), fingerprint stars, nodes and node attributes, branches and branch attributes, and a Distance Matrix (DM).

The following discussions with respect to FIGS. 2, 3, 4, 5 and 6 summarizes and condenses the disclosure of U.S. Pat. No. 5,613,014, and is incorporated herein to enable a fuller understanding of the present invention without a complete review of U.S. Pat. No. 5,613,014.

A file of reference or file fingerprints is created by digitizing the reference fingerprints to generate digital representations of the reference fingerprints, and storing the information in a digital memory which may be a read-only memory, magnetic tape, or the like. Such files already exist, and are maintained and updated by institutions such as the FBI.

The digitized reference fingerprint data is converted, by an electronic computing apparatus, to Attributed Relational Graph (ARG) form, which includes (a) nodes and node attributes and (b) branches between the nodes and branch attributes, derived from extracted digital minutia maps of the sets of reference fingerprints. The ARG includes various node and branch attributes, including topological information such as minutia location and direction.

The comparison of the set of unidentified fingerprints is made by, first, generating an ARG of each fingerprint of the unidentified fingerprint set, each of which ARG includes (a) nodes and node attributes and (b) branches between the nodes and branch attributes, all derived from an extracted digital minutia map of the set of unidentified fingerprints, much as was initially done for the reference or file fingerprints. The generation of the ARGs implicitly generates stars centered at each of the nodes; a star includes a central node, its branches, which are the branches immediately connected to the central node, and the nodes at the ends of its branches.

The second step in identification or comparison of an unidentified fingerprint set uses a computer to generate a Distance Matrix (DM) between (a) the stars in the ARG of one of the fingerprints of the set of unknown fingerprints and (b) the stars of the ARG of one of the fingerprints in one of the sets of reference fingerprints. The distance matrix includes a matrix element associated with each pair of stars being compared. In one embodiment, the elements of the Distance Matrix (DM) are sorted for each fingerprint pair, according to the value of the elements, to establish an order of star pair matches. A match core of consistent star pairs is generated using the DM and the ARG for each fingerprint being compared. In one embodiment, the generation of the match core is performed in an order established by the sorted DM. The match core for each fingerprint pair being compared is expanded by adding star pairs consistent with the star pairs included within the match core, until no more such star pairs consistent with the match core are available to be added. This may occur because there is a lack of a match between the fingerprints being compared, because all available star pairs of the fingerprint pair have been matched, or because a predetermined limiting number of matched star pairs has been reached. The procedure is repeated, comparing the unidentified fingerprint successively with each fingerprint of the reference file.

A memory, which may be an electronic memory such as a tape archive, optical disk memory, or the like, is preloaded with ARG representations of sets of reference fingerprint information, made as described above in relation to the unidentified fingerprint ARG.

The minutia which are used in matching are generally of two basic types, namely (a) joining points of ridges (bifurcations), and (b) the ends of ridges without branching or joining (ridge endings), but are not limited to these two types. The minimum information which must be available in relation to each minutia is the location, which is generally provided in X-Y Cartesian coordinates, but which might be provided in circular or other coordinates, and the direction. The direction of a minutia is defined in the abovementioned Lee and Guenssten text, but in general, may be said to be the direction of the ridge in a ridge ending situation, and a direction opposite to the direction of the common portion of a furcation in the bifurcation context.

After a memory is loaded with reference fingerprint ARG information, and an ARG has been generated of an unknown fingerprint, both are made available to a processor to allow a search to be made. The identification is accomplished by comparing the fingerprint to be identified sequentially with each relevant fingerprint in the reference fingerprint memory. Thus, two fingerprints, constituting a set, are always being compared; one unknown or search fingerprint, and one of the fingerprints from the reference memory. In general, the comparison of each fingerprint pair is started by generating a DM by calculations on both the unknown fingerprint ARG and on the ARG of one of the reference fingerprints.

The DM calculation is performed by comparing stars of the unknown fingerprint ARG with stars of a reference fingerprint ARG. The DM calculation results in a matrix with an element for each pair of stars of the ARG of the unknown fingerprint and the ARG of the reference fingerprint. The elements of the DM can be sorted in accordance with their magnitude or value. A processor attempts all possible combinations of matches of the star pairs, in order to build up, star pair by star pair, the largest consistent set of matching star pairs. In order to reduce the amount of processing which is unlikely to produce a substantial match, the processing is preferably performed by starting with the star pairs which are most alike.

FIG. 2 represents a simplified ARG of a fingerprint. In FIG. 2, circles or ovals represent nodes, each of which is associated with one minutia of the extracted fingerprint information. One such node is designated 310, and an adjacent node is designated 312. Each node, as described below, is the central node of a star. A line or branch 314 extends between nodes 310 and 312, and is attributed with or represents the topological relationship of the two nodes. Each node of FIG. 2 has a plurality of branches extending therefrom, but the minimum number of branches associated with a single node is one. A star consists of a selected center node, together with the branches which terminate thereon, and the neighbor nodes at the other ends of those branches. Thus, if node 310 is selected as the central node of the star, then the entire star consists of central node 310, branches 314, 324, 326, 328 and 330, together with nodes 312, 316, 318, 320 and 322. The term "neighbors" is assigned to nodes 312, 316, 318, 320, and 322, as they relate to central node 310. In FIG. 2, each node is associated with a graphic representation of the minutia type. For example, node 310 is associated with a graphic designated 340, which is in the form of a bifurcation, whereas node 312 is associated with a graphic 342, which represents a ridge ending. The orientations of the graphics also indicates the minutia direction. The minutia type and minutia direction information represented by the graphics in FIG. 2 are encoded in the digital words associated with the node.

FIG. 3 represents the format of a digital word which defines a node of FIG. 2. In FIG. 3, eighteen bits of the word are associated with the X, Y location of the minutia represented by the node, the next set of eight bits represent the direction of the minutia, a further eight bits define the ridge width local to the minutia (if available), and one or two further bits are assigned to indicate the minutia type (if available). While only one bit is actually needed to specify the two above-identified minutia types, an extra bit is available to encode information relating to additional information should such detail be available.

FIG. 4 represents a star 410 from the ARG of the unknown fingerprint, and another star 430 from the ARG of the reference fingerprint with which it is currently being compared. Star 410 may be considered to be a star among those of the ARG of an unknown fingerprint, while star 430 may be considered to be a star among those of the ARG of a reference fingerprint from a memory for comparison therewith. The central node of star 410 is designated 412, and the central node of star 430 is designated 432.

Figure 6:
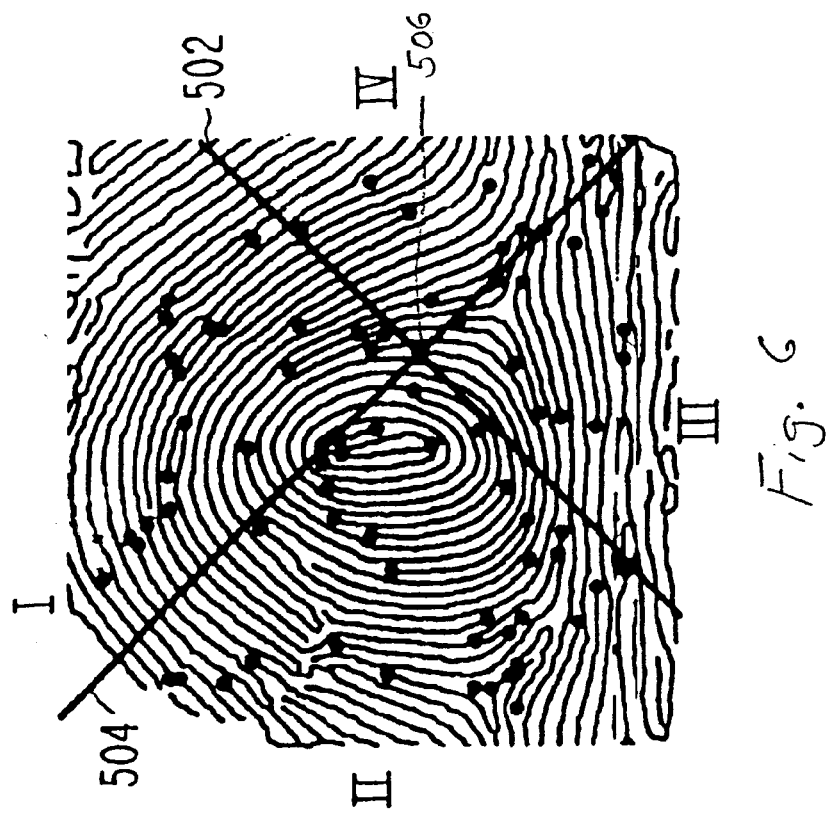
FIG. 6 illustrates the local coordinate system definition applied to one minutia from among the minutia of a particular fingerprint.
Figure 5:
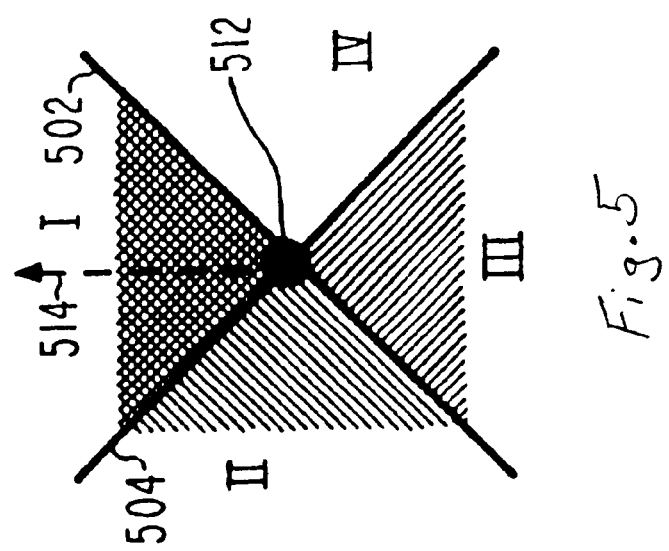
FIG. 5 illustrates a representation of a local coordinate system about a particular minutia.

FIGS. 5 and 6 aid in understanding a local coordinate system. In FIG. 5, a central minutia 512 has a minutia direction indicated by an arrow 514. Arrow 514 bisects the first quadrant, quadrant I, and the other quadrants II, III, and IV are located in successive counterclockwise positions about the central node. The direction of arrow 514 is digitally encoded as the minutia direction, and is one of the attributes associated with the node which corresponds with the minutia in the ARG.

In FIG. 6, axes 502 and 504 intersect at a location which is coincident with a central minutia 506 of a skeletonized fingerprint impression, and the direction of the minutia bisects the first (I) quadrant defined by lines 502 and 504. As to the minutia at 0, 0 of the local coordinate system of FIG. 6, the nearest minutia (if they exist) in the first, second, third and fourth quadrants are defined as neighbors.

With the above condensed explanations from U.S. Pat. No. 5,613,014 in mind, the following explanation is set forth with respect to the prescreen function of the present invention.

FIG. 1 is a diagram of an Attribute Relational Graph (ARG)-based prescreen method or algorithm of the present invention which prescreens reference or file fingerprints against a search fingerprint, and selects a top percentage of the most promising reference or file fingerprints for further processing in an Automated Fingerprint Identification System (AFIS).

For each minutia (termed a central minutia in the explanation below) of a fingerprint that is characterized in both a search fingerprint and a reference or file fingerprint in a reference file, the [x,y] location and directional component of that central minutia is determined, and a set of minutia quadrant neighbors is also determined for that central minutia based upon its directional component, and that data is placed in a feature vector file similar to that of FIG. 3. The space about each central minutia is divided into four quadrants, with the first quadrant being centered about the directional component of the central minutia, and the second, third and fourth quadrants being spaced every 90° in a counterclockwise direction from the first quadrant, as illustrated in FIGS. 5 and 6. The closest minutia in each of the four quadrants is determined to be the minutia quadrant neighbor in that quadrant for each central minutia. In alternative embodiments, other types of coordinate systems and quadrants can be employed, such as a clockwise spacing of quadrants, a different number of quadrants, or a polar coordinate system. This processing is precomputed for each minutia, and does not add to the processing time of the prescreen filtering method and algorithm of the present invention.

Let U be a set of minutia for a search fingerprint and V be a set of minutia for a reference or file fingerprint. The Distance Matrix (DM) ARGMatch™ identification method and algorithm of the FBI/AFIS system, modified for quadrant neighbor processing, generates a Distance Matrix (DM) score pursuant to a Distance Matrix Algorithm for each and every different pair of minutia [u,v] in the two different sets of minutia U, V.

Referring to FIG. 1, at step 10, for each search minutia $[u_i]$, calculate the minutia to neighbor distances using the [x,y] coordinates thereof. Set a flag to perform this distance calculation only once for the entire search against a repository or file set.

At step 10, for each search minutia $[u_i]$, the directional components of each and every different pairing with each different file minutia $[v_j]$ from the file set are compared at step 20 to ensure that they are within a given angular tolerance (e.g. +/−30 degrees). This given angular tolerance is selected to allow for a reasonable variation in rotational alignments which are a result of the different fingerprint collection and imaging processes, but does not allow a pair of minutia from completely different ridge flows to be compared.

After this directional alignment tolerance criterion has been passed at step 20, calculate the file minutia [$v_j$] to neighbor distance at step 30.

Compare each search minutia [$u_i$] neighbor pair with the file minutia [$v_j$] neighbor pair to determine differences in angular directions and differences in minutia-neighbor distances (Euclidian distance) at step 40.

If the differences are similar, a score is calculated for the minutia pair [$u_i$, $v_j$] using Equation 1 at step 50.

In one embodiment, the maximum obtainable score for a single minutia pair [$u_i$, $v_j$] is 30,800 points. The domain for the direction points ranges from 0 to 7, where 7 points indicates a perfect angular alignment. The domain for the Euclidian distance points ranges from 0 to 11, where 11 points indicates no difference in minutia-neighbor distances.

If score $S_{ij}$ passes a minimum threshold of 100 points at step 60, than $S_{ij}$ is stored in the Distance Matrix.

$$S_{ij} = \sum_{Neighbor=1}^{4} (\text{Direction points} \times \text{Euclidian distance points} * 100)$$

Equation (1)

For a minutia pair [u,v], if the maximum DM score for [$u,v_j$] (i.e., a single search minutia u compared with all of the file minutia) occurs at v, and similarly the maximum DM score for [$u_i$, v] (i.e., a single file minutia v compared with all of the search minutia) occurs at u, then this minutia pair [u,v] is considered to be well matched. In order to prevent the pairing of poorly aligned minutia, a minimum DM score must be obtained in order for the minutia pair to be considered well matched.

A set of well matched minutia pairs forms the basis for the prescreen function of the present invention. The size of this set of well matched minutia pairs, relative to the sizes of other sets of well matched minutia pairs for all other file fingerprints in the repository file, determines if a particular file fingerprint is passed along to the more complete and rigorous matching functions of an Automated Fingerprint Identification System (AFIS), in a manner as disclosed in U.S. Pat. Nos. 5,613,014 and 5,933,516.

A final consistency check is performed on each set of well matched minutia pairs. The difference of each minutia pair's directional components (a virtual rotational transformation) is computed and placed into a histogram. Following a smoothing process, the maximum value in the histogram indicates the most likely rotational transformation for a matching of this set of well matched minutia pairs. Using the most likely rotational transformation, the difference of each minutia pair's directional components of the set of well-matched minutia pairs is now recomputed, and any minutia pair exhibiting a directional difference greater than a given tolerance is removed from further consideration, to derive a final set of well-matched minutia pairs.

The size of this final set of well matched minutia pairs is the prescreen function or metric for a particular search-file pair of fingerprints. In general, the prescreen function passes along a top percentage of the number of file fingerprints forming the repository file for further AFIS processing. The size of this final set of well matched minutia pairs is the metric or criteria that is used in determining the top percentage.

While several embodiments and variations of the present invention for a fingerprint matching system with ARG-based prescreener are described in detail herein, it should be apparent that the disclosure and teachings of the present invention will suggest many alternative designs to those skilled in the art.

What is claimed is:

1. A prescreen method for prescreening the matching of an unidentified search fingerprint with a set of file fingerprints in a reference file comprising:

a. identifying a set of characterizing minutia for each unidentified search fingerprint and file fingerprint to be compared, which includes at least a positional location and a directional component for each minutia;

b. for each minutia, while considering that minutia to be a central minutia, identifying a set of minutia neighbors for that central minutia based upon the directional component of the central minutia by dividing the space about that central minutia into a plurality of quadrants referenced to the directional component of the central minutia, wherein the closest minutia in each of the quadrants is determined to be the minutia neighbor in that quadrant of the central minutia;

c. comparing the directional components of each different pair of minutia in the unidentified fingerprint and the file fingerprint to ensure that they are within a given angular tolerance, which is selected to allow for a reasonable variation in rotational alignments between the different fingerprints, but does not allow a pair of minutia from completely different ridge flows to be compared;

d. for the different passed pairs of minutia which are within the given angular tolerance, generating a matching score for each passed pair of minutia by performing a virtual alignment of the pair of minutia in location and direction, and then by comparing the distances and relative orientations between each of the pairs of minutia neighbors in each of the plurality of quadrants, which represents how well each different pair of minutia match each other;

e. determining file fingerprints to be passed onto a more rigorous and complete matching with the unidentified fingerprint in an automated fingerprint identification system on the basis of the matching scores of sets of well-matched pairs of minutia.

2. The prescreen method of claim 1, wherein the space about each central minutia is divided into four quadrants, with the first quadrant being centered about the directional component of the central minutia, and the second, third and fourth quadrants being spaced every 90° from the first quadrant.

3. The prescreen method of claim 2, wherein the quadrants are spaced every 90° in a counterclockwise direction.

4. The prescreen method of claim 1, wherein to prevent the pairing of poorly aligned minutia, a minimum matching score must be obtained in order for a minutia pair to be considered well matched.

5. The prescreen method of claim 4, wherein the matching score comprises a distance matrix score, and a minimum distance matrix score must be obtained in order for the minutia pair to be considered well matched.

6. The prescreen method of claim 1, wherein for a single search fingerprint compared with a single reference file fingerprint, a set of well matched minutia pairs forms the basis for the prescreen function, and the size of this set of well matched minutia pairs, relative to the sizes of other sets of well matched minutia pairs for all other file fingerprints in the reference file, determines if a particular file fingerprint is passed along to the more complete and rigorous matching functions of an automated fingerprint identification system.

7. The prescreen method of claim 1, wherein a final consistency check is performed on a set of well matched minutia pairs in which the difference of each minutia pair's directional components, in a virtual rotational transformation, is computed and placed into a histogram.

8. The prescreen method of claim 7, wherein a smoothing process is performed on the histogram, and following the smoothing process, a maximum value in the histogram indicates the most likely rotational transformation for a matching of a set of well matched minutia pairs.

9. The prescreen method of claim 8, wherein using the most likely rotational transformation, the difference of each minutia pair's directional components of the set of well-matched minutia pairs is then recomputed, and any minutia pair exhibiting a directional difference greater than a given tolerance is removed from further consideration, to derive a final set of well-matched minutia pairs.

* * * * *